(12) United States Patent
Tang et al.

(10) Patent No.: US 7,969,664 B2
(45) Date of Patent: Jun. 28, 2011

(54) IMAGING LENS ASSEMBLY

(75) Inventors: Hsiang Chi Tang, Taichung (TW);
Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 62 days.

(21) Appl. No.: 12/654,920

(22) Filed: Jan. 8, 2010

(65) Prior Publication Data
US 2011/0075271 A1    Mar. 31, 2011

(30) Foreign Application Priority Data
Sep. 30, 2009  (TW) ............................... 98133095 A

(51) Int. Cl.
*G02B 9/34* (2006.01)
*G02B 13/16* (2006.01)
*G02B 13/18* (2006.01)
*H04N 5/225* (2006.01)

(52) U.S. Cl. ......... 359/773; 348/335; 359/715; 359/771

(58) Field of Classification Search .................. 348/335; 359/715, 773, 772, 771
See application file for complete search history.

(56) References Cited

U.S. PATENT DOCUMENTS

| | | | |
|---|---|---|---|
| 7,277,238 B2 | 10/2007 | Noda | |
| 7,365,920 B2 | 4/2008 | Noda | |
| 7,864,454 B1 * | 1/2011 | Tang et al. | 359/764 |
| 7,911,711 B1 * | 3/2011 | Tang et al. | 359/764 |
| 2011/0058089 A1 * | 3/2011 | Tang et al. | 348/340 |

* cited by examiner

*Primary Examiner* — David N Spector
(74) *Attorney, Agent, or Firm* — Bacon & Thomas, PLLC

(57) ABSTRACT

This invention provides an imaging lens assembly comprising: in order from an object side to an image side: a first lens with positive refractive power having a convex object-side surface and a convex image-side surface; a second lens with negative refractive power having a concave object-side surface; a third lens with positive refractive power having a convex image-side surface, at least one of both surfaces thereof being aspheric; and a fourth lens with negative refractive power having a convex object-side surface and a concave image-side surface on which at least one inflection point is formed; wherein there are four lenses with refractive power, an on-axis spacing between an aperture stop and an electronic sensor provided therein is SL, an on-axis spacing between the object-side surface of the first lens and the electronic sensor is TTL, they satisfy the relation: $0.75 < SL/TTL < 0.90$.

30 Claims, 13 Drawing Sheets

| TABLE 1 | | | | | | | |
|---|---|---|---|---|---|---|---|
| (Embodiment 1) | | | | | | | |
| f = 3.68 mm, Fno = 2.80, HFOV = 31.2 deg. | | | | | | | |
| Surface # | | Curvature Radius | Thickness | Material | Index | Abbe # | Focal length |
| 0 | Object | Plano | Infinity | | | | |
| 1 | Lens 1 | 1.73925 (ASP) | 0.625 | Plastic | 1.544 | 55.9 | 2.46 |
| 2 | | -5.09050 (ASP) | -0.015 | | | | |
| 3 | Ape. Stop | Plano | 0.169 | | | | |
| 4 | Lens 2 | -11.92590 (ASP) | 0.415 | Plastic | 1.632 | 23.4 | -3.55 |
| 5 | | 2.80352 (ASP) | 0.511 | | | | |
| 6 | Lens 3 | -1.92584 (ASP) | 0.851 | Plastic | 1.544 | 55.9 | 2.45 |
| 7 | | -0.91133 (ASP) | 0.050 | | | | |
| 8 | Lens 4 | 2.48611 (ASP) | 0.464 | Plastic | 1.530 | 55.8 | -3.22 |
| 9 | | 0.94687 (ASP) | 0.533 | | | | |
| 10 | IR-filter | Plano | 0.300 | Glass | 1.517 | 64.2 | - |
| 11 | | Plano | 0.825 | | | | |
| 12 | Image | Plano | | | | | |

Fig.7

| TABLE 2A | | | | | | |
|---|---|---|---|---|---|---|
| Aspheric Coefficients | | | | | | |
| Surface # | 1 | 2 | 4 | 5 | 6 | 7 |
| k = | -3.38884E-01 | 1.34421E+01 | -1.00000E+00 | 8.00042E-01 | -1.30573E+00 | -1.02146E+00 |
| A4 = | -2.01351E-03 | 5.25614E-02 | 1.25177E-01 | 1.44634E-01 | 2.84179E-02 | 1.30316E-01 |
| A6 = | -6.32634E-02 | -1.23161E-01 | -2.35722E-01 | -1.26894E-01 | -2.56766E-01 | -3.22351E-01 |
| A8 = | 1.07177E-01 | -1.41528E-01 | -1.33563E-02 | 8.21070E-02 | -6.26170E-02 | 2.62094E-01 |
| A10= | -1.69248E-01 | 1.76598E-01 | 1.46175E-01 | | 5.09976E-01 | -1.25891E-01 |
| A12= | | | | | 1.42992E-01 | -2.40606E-03 |
| A14= | | | | | -1.43405E+00 | 5.11965E-02 |
| A16= | | | | | 1.00769E+00 | -2.94147E-02 |

Fig.8A

| TABLE 2B | | |
|---|---|---|
| Aspheric Coefficients | | |
| Surface # | 8 | 9 |
| k = | -1.00000E+00 | -5.03780E+00 |
| A1 = | | |
| A2 = | | |
| A3 = | | |
| A4 = | -3.19330E-01 | -1.86511E-01 |
| A5 = | | |
| A6 = | 9.84235E-02 | 8.77564E-02 |
| A7 = | | |
| A8 = | -1.12246E-02 | -3.38882E-02 |
| A9 = | | |
| A10= | 1.50679E-02 | 6.71457E-03 |
| A11= | | |
| A12= | -7.38414E-03 | 3.67034E-04 |
| A13= | | |
| A14= | -3.29043E-03 | -5.18231E-04 |
| A15= | | |
| A16= | 1.53198E-03 | 7.14831E-05 |

Fig.8B

| TABLE 3 | | | | | | |
|---|---|---|---|---|---|---|
| (Embodiment 2) | | | | | | |
| f = 3.53 mm, Fno = 2.80, HFOV = 32.0 deg. | | | | | | |
| Surface # | | Curvature Radius | Thickness | Material | Index | Abbe # | Focal length |
| 0 | Object | Plano | Infinity | | | | |
| 1 | Lens 1 | 1.58178 (ASP) | 0.624 | Plastic | 1.544 | 55.9 | 2.21 |
| 2 | | -4.32830 (ASP) | -0.014 | | | | |
| 3 | Ape. Stop | Plano | 0.145 | | | | |
| 4 | Lens 2 | -3.36700 (ASP) | 0.280 | Plastic | 1.632 | 23.4 | -3.62 |
| 5 | | 7.35330 (ASP) | 0.618 | | | | |
| 6 | Lens 3 | -1.60171 (ASP) | 0.797 | Plastic | 1.544 | 55.9 | 2.81 |
| 7 | | -0.91908 (ASP) | 0.150 | | | | |
| 8 | Lens 4 | 2.04019 (ASP) | 0.406 | Plastic | 1.530 | 55.8 | -3.37 |
| 9 | | 0.88679 (ASP) | 0.700 | | | | |
| 10 | IR-filter | Plano | 0.300 | Glass | 1.517 | 64.2 | - |
| 11 | | Plano | 0.479 | | | | |
| 12 | Image | Plano | | | | | |

Fig.9

| TABLE 4A | | | | | | |
|---|---|---|---|---|---|---|
| Aspheric Coefficients | | | | | | |
| Surface # | 1 | 2 | 4 | 5 | 6 | 7 |
| k = | -4.00085E-01 | -5.75658E+00 | -1.00000E+00 | 3.02121E+01 | 8.58148E-02 | -8.95209E-01 |
| A4 = | 3.23832E-03 | 8.56155E-02 | 3.85527E-01 | 3.34132E-01 | -4.48088E-03 | 1.10511E-01 |
| A6 = | -7.93176E-02 | -1.89174E-01 | -6.54784E-01 | -4.22923E-01 | -1.90878E-01 | -3.01458E-01 |
| A8 = | 1.51323E-01 | -2.07816E-01 | 4.27724E-01 | 3.77838E-01 | -1.76156E-01 | 3.28609E-01 |
| A10= | -2.34383E-01 | 3.11397E-01 | 5.03149E-02 | | 1.88885E-01 | -2.45859E-01 |
| A12= | | | | | 4.70045E-01 | 9.87710E-03 |
| A14= | | | | | -5.30266E-01 | 1.04709E-01 |
| A16= | | | | | 3.22797E-01 | -3.28400E-02 |

Fig.10A

| TABLE 4B | | |
|---|---|---|
| Aspheric Coefficients | | |
| Surface # | 8 | 9 |
| k = | -1.00000E+00 | -4.23326E+00 |
| A1 = | | |
| A2 = | | |
| A3 = | | |
| A4 = | -3.63769E-01 | -1.92344E-01 |
| A5 = | | |
| A6 = | 1.64648E-01 | 9.32822E-02 |
| A7 = | | |
| A8 = | -5.27165E-02 | -3.32468E-02 |
| A9 = | | |
| A10= | 1.75379E-02 | 4.98093E-03 |
| A11= | | |
| A12= | -1.16066E-03 | 6.92204E-04 |
| A13= | | |
| A14= | -1.92428E-03 | -3.22547E-04 |
| A15= | | |
| A16= | 4.28094E-04 | 2.41379E-05 |

Fig.10B

| TABLE 5 | | | | | | | |
|---|---|---|---|---|---|---|---|
| (Embodiment 3) | | | | | | | |
| f = 3.82 mm, Fno = 2.85, HFOV = 30.1 deg. | | | | | | | |
| Surface # | | Curvature Radius | Thickness | Material | Index | Abbe # | Focal length |
| 0 | Object | Plano | Infinity | | | | |
| 1 | Lens 1 | 1.35568 (ASP) | 0.650 | Plastic | 1.544 | 55.9 | 2.74 |
| 2 | | 12.50000 (ASP) | 0.068 | | | | |
| 3 | Ape. Stop | Plano | 0.072 | | | | |
| 4 | Lens 2 | -8.51060 (ASP) | 0.500 | Plastic | 1.632 | 23.4 | -3.97 |
| 5 | | 3.63780 (ASP) | 0.557 | | | | |
| 6 | Lens 3 | -2.95247 (ASP) | 0.900 | Plastic | 1.544 | 55.9 | 2.25 |
| 7 | | -0.95789 (ASP) | 0.239 | | | | |
| 8 | Lens 4 | 3.24580 (ASP) | 0.320 | Plastic | 1.544 | 55.9 | -2.65 |
| 9 | | 0.96273 (ASP) | 0.700 | | | | |
| 10 | IR-filter | Plano | 0.300 | Glass | 1.517 | 64.2 | - |
| 11 | | Plano | 0.423 | | | | |
| 12 | Image | Plano | | | | | |

Fig.11

| TABLE 6A | | | | | | |
|---|---|---|---|---|---|---|
| Aspheric Coefficients | | | | | | |
| Surface # | 1 | 2 | 4 | 5 | 6 | 7 |
| k = | -2.67000E-01 | 3.30264E+02 | -1.00000E+00 | -2.12917E+00 | 1.96163E-01 | -1.00965E+00 |
| A4 = | 4.10601E-02 | 7.91853E-02 | 3.95380E-02 | 1.03920E-01 | -1.99664E-02 | 1.38197E-01 |
| A6 = | 6.90752E-02 | -1.31967E-01 | -1.86773E-01 | -3.43697E-02 | -7.10387E-02 | -3.45854E-01 |
| A8 = | -4.79255E-02 | 4.66789E-01 | 1.81178E-01 | -5.21603E-03 | -5.75622E-02 | 3.69623E-01 |
| A10= | 1.10468E-01 | -1.04751E+00 | -7.09775E-01 | | 3.20583E-02 | -2.25165E-01 |
| A12= | | | | | 3.92519E-01 | -2.54154E-03 |
| A14= | | | | | -4.27748E-01 | 8.16664E-02 |
| A16= | | | | | 1.28232E-01 | -2.60161E-02 |

Fig.12A

| TABLE 6B | | |
|---|---|---|
| Aspheric Coefficients | | |
| Surface # | 8 | 9 |
| k = | -1.00000E+00 | -5.00971E+00 |
| A1 = | | |
| A2 = | | |
| A3 = | | |
| A4 = | -3.71223E-01 | -2.14378E-01 |
| A5 = | | |
| A6 = | 1.48517E-01 | 1.02527E-01 |
| A7 = | | |
| A8 = | -3.84058E-02 | -3.52767E-02 |
| A9 = | | |
| A10= | 1.61253E-02 | 5.52817E-03 |
| A11= | | |
| A12= | -1.98594E-03 | 4.91816E-04 |
| A13= | | |
| A14= | -1.88550E-03 | -2.82353E-04 |
| A15= | | |
| A16= | 4.65706E-04 | 2.13411E-05 |

Fig.12B

| TABLE 7 | | | |
|---|---|---|---|
| | Embodiment 1 | Embodiment 2 | Embodiment 3 |
| f | 3.68 | 3.53 | 3.82 |
| Fno | 2.80 | 2.80 | 2.85 |
| HFOV | 31.2 | 32.0 | 30.1 |
| V1-V2 | 32.5 | 32.5 | 32.5 |
| (T23/f)*100 | 13.9 | 17.5 | 14.6 |
| R1/R2 | -0.34 | -0.37 | 0.11 |
| R3/f | -3.24 | -0.95 | -2.23 |
| ANG32 | -66.0 | -46.5 | -43.5 |
| f/f1 | 1.50 | 1.60 | 1.39 |
| f/f3 | 1.50 | 1.26 | 1.70 |
| f1/f3 | 1.00 | 0.79 | 1.22 |
| f3/f4 | -0.76 | -0.83 | -0.85 |
| SL/TTL | 0.82 | 0.82 | 0.80 |
| TTL/ImgH | 2.07 | 1.96 | 2.07 |

Fig.13

IMAGING LENS ASSEMBLY

BACKGROUND OF THE INVENTION

1. Field of the Invention

The present invention relates to an imaging lens assembly, and more particularly, to a compact imaging lens assembly used in a mobile phone camera.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and the resolution of compact imaging lenses has gradually increased, there is an increasing demand for compact imaging lenses featuring better image quality.

A conventional imaging lens assembly for mobile phone cameras, such as the one disclosed in U.S. Pat. No. 7,365,920, generally comprises four lens elements and an aperture stop disposed in front of the four lens elements, wherein two spherical-surface glass lenses are used as the first and second lens elements, and being adhered together to form a doublet and thereby to correct the chromatic aberration. Such an arrangement of optical elements, however, has the following disadvantages: (1) the freedom of the system is curtailed due to the employment of excess number of spherical-surface glass lenses, thus the total track length of the system cannot be reduced easily; (2) the process of making the glass lenses adhered together is complicated, posing difficulties in manufacture.

U.S. Pat. No. 7,277,238 provides an imaging lens array comprising four respective lenses wherein a plurality of lenses are double-sided aspherical lenses so that the total track length of the system can be effectively reduced and the image quality can be improved as well. However, placing the aperture stop in front of the first lens element increases the sensitivity of the system, making it more difficult to control the manufacturing yields of the lens assembly.

Therefore, a need exists in the art for an imaging lens assembly that requires simple manufacturing process, maintains a proper total track length and a moderate sensitivity and is applicable to high-resolution mobile phone cameras.

SUMMARY OF THE INVENTION

The present invention provides an imaging lens assembly comprising: in order from an object side to an image side: a first lens element with positive refractive power having a convex object-side surface and a convex image-side surface; a second lens element with negative refractive power having a concave object-side surface; a third lens element with positive refractive power having a convex image-side surface, at least one of the object-side and image-side surfaces thereof being aspheric; and a fourth lens element with negative refractive power having a convex object-side surface and a concave image-side surface on which at least one inflection point is formed; wherein there are four lens elements with refractive power; wherein the imaging lens assembly further comprises an aperture stop disposed between the first and second lens elements and an electronic sensor on which an object is imaged; and wherein the on-axis spacing between the aperture stop and the electronic sensor is SL, the on-axis spacing between the object-side surface of the first lens element and the electronic sensor is TTL, and they satisfy the relation: $0.75 < SL/TTL < 0.90$.

Such an arrangement of optical elements can reduce the size as well as the sensitivity of the imaging lens assembly and enables the lens assembly to obtain higher resolution.

In the present imaging lens assembly, the first lens element has positive refractive power so that the total track length of the imaging lens assembly can be effectively reduced; the second lens element has negative refractive power so that the chromatic aberration of the system can be favorably corrected; the third lens element has positive refractive power so that the proportion of positive refractive power contributed by the first lens element can be effectively reduced to mitigate the sensitivity of the system; the fourth lens element with negative refractive power and the third lens element with positive refractive power form a telephoto structure so that the back focal length of the system can be favorably reduced, thereby reducing the total track length.

In the present imaging lens assembly, the first lens element may be a bi-convex lens element having a convex object-side surface and a convex image-side surface, or a meniscus lens element having a convex object-side surface and a concave image-side surface. When the first lens element is a bi-convex lens element, the refractive power thereof can be effectively enhanced, thus allowing a shortening of the total track length of the imaging lens assembly. When the first lens element is a meniscus lens element, the astigmatism of the system can be corrected more favorably. The second lens element has a concave object-side surface so as to favorably extend the back focal length of the system, thereby providing sufficient space to accommodate other components. When the object-side and image-side surfaces of the second lens element are both concave, the Petzval Sum of the system can be corrected more effectively and the back focal length of the system can be extended as well. The third lens element has a concave object-side surface and a convex image-side surface and the fourth lens element has a convex object-side surface and a concave image-side surface, so as to facilitate the correction of the astigmatism and high order aberrations of the system.

In the aforementioned imaging lens assembly, the first lens element provides positive refractive power, and the aperture stop is disposed near the object side of the imaging lens assembly, thereby the total track length of the imaging lens assembly can be reduced effectively. The aforementioned arrangement also enables the exit pupil of the imaging lens assembly to be positioned far away from the image plane, thus light will be projected onto the electronic sensor at a nearly perpendicular angle, and this is the telecentric feature of the image side. The telecentric feature is very important to the photosensitive power of the current solid-state sensor as it can improve the photosensitivity of the sensor to reduce the probability of the occurrence of shading. Moreover, the fourth lens element is provided with at least one inflection point, thereby the angle at which the light is projected onto the sensor from the off-axis field can be effectively reduced to further correct the off-axis aberrations. In addition, the aperture stop is disposed between the first and second lens elements so that a wide field of view can be favorably achieved. Such an aperture stop placement facilitates the correction of the distortion and chromatic aberration of magnification and achieves a balance between the reduction of the lens assembly's size and the mitigation of the system's sensitivity.

The present invention provides another imaging lens assembly comprising, in order from the object side to the image side: a first lens element with positive refractive power having a convex object-side surface; a second lens element with negative refractive power having a concave object-side surface and a concave image-side surface; a third lens element with positive refractive power having a concave object-side surface and a convex image-side surface, at least one of the object-side and image-side surfaces thereof being aspheric; and a fourth lens element with negative refractive power having a convex object-side surface and a concave image-side surface on which at least one inflection point is formed; wherein there are four lens elements with refractive power; wherein the imaging lens assembly further comprises an aperture stop disposed between the first and second lens elements and an electronic sensor on which an object is imaged; and wherein the on-axis spacing between the aperture stop and the electronic sensor is SL, the on-axis spacing between the object-side surface of the first lens element and the electronic sensor is TTL, and they satisfy the relation: $0.75 < SL/TTL < 0.90$.

The present invention provides yet another imaging lens assembly comprising, in order from the object side to the image side: a first lens element with positive refractive power having a convex object-side surface; a second lens element with negative refractive power having a concave object-side surface; a third lens element with positive refractive power, the object-side and image-side surfaces thereof being aspheric; and a fourth lens element with negative refractive power having a convex object-side surface and a concave image-side surface on which at least one inflection point is formed, the object-side and image-side surfaces thereof being aspheric; wherein there are four lens elements with refractive power; wherein the imaging lens assembly further comprises an aperture stop disposed between the first and second lens elements and an electronic sensor on which an object is imaged; and wherein the on-axis spacing between the aperture stop and the electronic sensor is SL, the on-axis spacing between the object-side surface of the first lens element and the electronic sensor is TTL, the on-axis spacing between the second and third lens elements is T23, the focal length of the imaging lens assembly is f, the Abbe number of the first lens element is V1, the Abbe number of the second lens element is V2, and they satisfy the relations: $0.75 < SL/TTL < 0.90$, $7.0 < (T23/f)*100 < 20.0$, $30.0 < V1 - V2 < 38.0$.

BRIEF DESCRIPTION OF THE DRAWINGS

FIG. 7 is TABLE 1 which lists the optical data of the first embodiment.

FIGS. 8A and 8B are TABLES 2A and 2B which list the aspheric surface data of the first embodiment.

FIG. 9 is TABLE 3 which lists the optical data of the second embodiment.

FIGS. 10A and 10B are TABLES 4A and 4B which list the aspheric surface data of the second embodiment.

FIG. 11 is TABLE 5 which lists the optical data of the third embodiment.

FIGS. 12A and 12B are TABLES 6A and 6B which list the aspheric surface data of the third embodiment.

FIG. 13 is TABLE 7 which lists the data of the respective embodiments resulting from the equations.

DETAILED DESCRIPTION OF THE PREFERRED EMBODIMENTS

Figure 1:
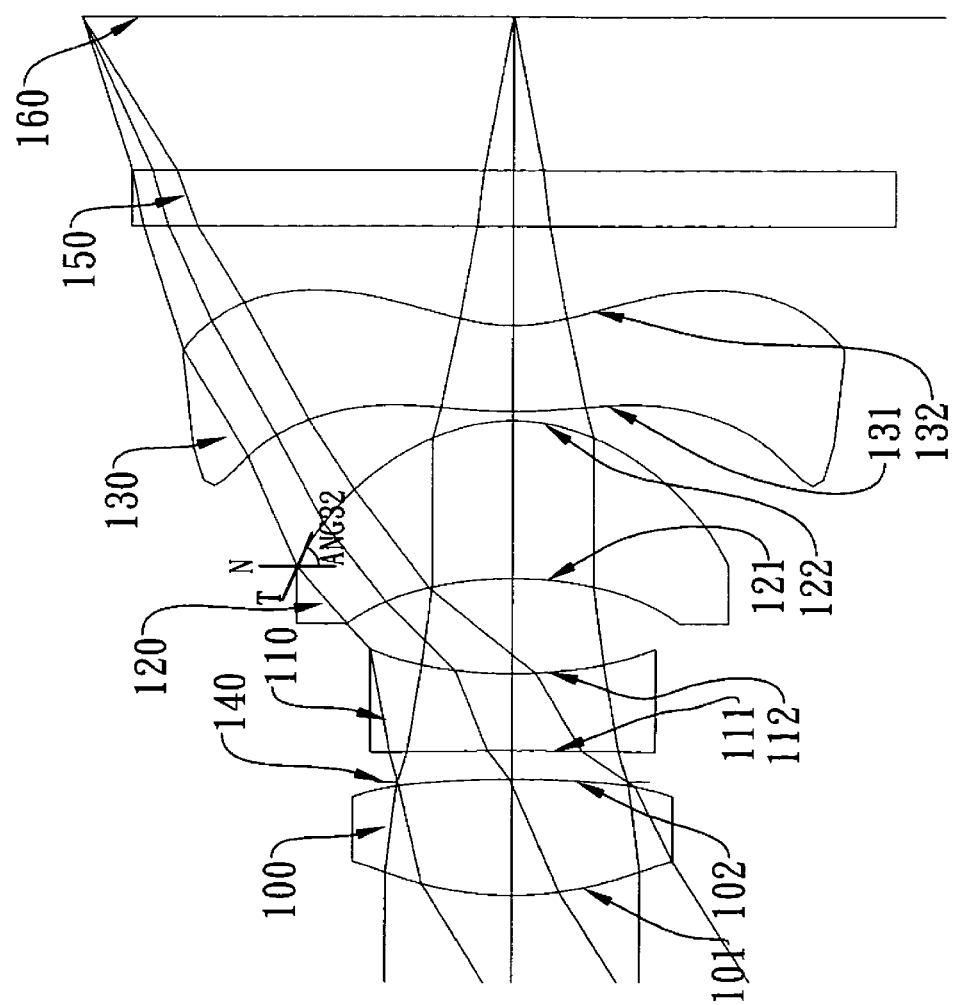
FIG. 1 shows an imaging lens assembly in accordance with a first embodiment of the present invention.

The present invention provides an imaging lens assembly comprising, in order from the object side to the image side: a first lens element with positive refractive power having a convex object-side surface and a convex image-side surface; a second lens element with negative refractive power having a concave object-side surface; a third lens element with positive refractive power having a convex image-side surface, at least one of the object-side and image-side surfaces thereof being aspheric; and a fourth lens element with negative refractive power having a convex object-side surface and a concave image-side surface on which at least one inflection point is formed; wherein there are four lens elements with refractive power; wherein the imaging lens assembly further comprises an aperture stop disposed between the first and second lens elements and an electronic sensor on which an object is imaged; and wherein the on-axis spacing between the aperture stop and the electronic sensor is SL, the on-axis spacing between the object-side surface of the first lens element and the electronic sensor is TTL, and they satisfy the relation: $0.75 < SL/TTL < 0.90$.

When the above relation is satisfied, a wide field of view can be favorably achieved, and a balance between the reduction of the lens assembly's size and the mitigation of the system's sensitivity can be attained.

In the aforementioned imaging lens assembly, it is preferable that the second lens element has a concave image-side surface so as to effectively correct the Petzval Sum and extend the back focal length of the system. Preferably, the third lens element has a concave object-side surface so as to facilitate the correction of the astigmatism of the system.

In the aforementioned imaging lens assembly, it is preferable that the object-side and image-side surfaces of the third and fourth lens elements are aspheric. Aspheric surfaces can be easily made into non-spherical profiles, allowing more design parameter freedom which can be used to reduce aberrations and the number of the lens elements, so that the total track length of the imaging lens assembly can be effectively reduced and the image quality can be improved as well.

In the aforementioned imaging lens assembly, the focal length of the imaging lens assembly is f, the focal length of the first lens element is f1, and they preferably satisfy the relation: $1.20 < f/f1 < 1.90$. When the above relation is satisfied, the refractive power of the first lens element is more balanced so that the total track length of the system can be effectively controlled to keep the imaging lens assembly compact. The above relation also prevents the high order spherical aberration from becoming too large, so that the image quality can be improved. And it will be more preferable that f and f1 satisfy the relation: $1.40 < f/f1 < 1.65$.

In the aforementioned imaging lens assembly, the Abbe number of the first lens element is V1, the Abbe number of the second lens element is V2, and they preferably satisfy the relation: $28.0 < V1 - V2 < 46.0$. The above relation facilitates the correction of the chromatic aberration of the imaging lens assembly. And it will be more preferable that V1 and V2 satisfy the relation: $30.0 < V1 - V2 < 38.0$.

In the aforementioned imaging lens assembly, the focal length of the first lens element is f1, the focal length of the third lens element is f3, and they preferably satisfy the relation: $0.70<f1/f3<1.50$. When the above relation is satisfied, the refractive power of the first and third lens elements is more balanced, thereby the sensitivity of the system can be favorably reduced.

In the aforementioned imaging lens assembly, the focal length of the third lens element is f3, the focal length of the fourth lens element is f4, and they preferably satisfy the relation: $-1.50<f3/f4<-0.50$. When the above relation is satisfied, the telephoto structure formed by the third and fourth lens elements can be favorably secured, thereby effectively reducing the total track length of the system.

In the aforementioned imaging lens assembly, the on-axis spacing between the second and third lens elements is T23, the focal length of the imaging lens assembly is f, and they preferably satisfy the relation: $7.0<(T23/f)*100<20.0$. The above relation facilitates the correction of the high order aberrations of the imaging lens assembly.

In the aforementioned imaging lens assembly, the radius of curvature of the object-side surface of the first lens element is R1, the radius of curvature of the image-side surface of the first lens element is R2, and they preferably satisfy the relation: $-0.8<R1/R2<0.0$. The above relation facilitates the correction of the spherical aberration of the system.

In the aforementioned imaging lens assembly, the radius of curvature of the object-side surface of the second lens element is R3, the focal length of the imaging lens assembly is f, and they preferably satisfy the relation: $-18.0<R3/f<-0.7$. When the above relation is satisfied, the back focal length of the imaging lens assembly can be effectively extended, thereby providing sufficient space to accommodate other components while preventing the total track length of the system from becoming too long.

In the aforementioned imaging lens assembly, the farthest point of the effective area of the image-side surface that allows incoming light to pass through the third lens element is the position of the clear aperture radius; a tangential plane is tangent to the image-side surface of the third lens element at the position of the clear aperture radius; a plane intersects the image-side surface of the third lens element at the position of the clear aperture radius and is perpendicular to the optical axis; the angle between the tangential plane and the plane is a tangential angle, ANG32, at the position of the clear aperture radius of the image-side surface of the third lens element. When the intersection of the plane and the optical axis is closer to the object side than the intersection of the tangential plane and the optical axis, ANG32 is negative. When the intersection of the plane and the optical axis is farther away from the object side than the intersection of the tangential plane and the optical axis, ANG32 is positive. It is preferable that ANG32 satisfies the relation: $ANG32<-40$ deg. The above relation effectively reduces the angle at which the light is projected onto the sensor and enhances the system's capability to correct the off-axis aberrations more favorably.

The aforementioned imaging lens assembly further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: $TTL/ImgH<2.15$. The above relation enables the imaging lens assembly to maintain a compact form so that it can be equipped in compact portable electronic products.

The present invention provides another imaging lens assembly comprising, in order from the object side to the image side: a first lens element with positive refractive power having a convex object-side surface; a second lens element with negative refractive power having a concave object-side surface and a concave image-side surface; a third lens element with positive refractive power having a concave object-side surface and a convex image-side surface, at least one of the object-side and image-side surfaces thereof being aspheric; and a fourth lens element with negative refractive power having a convex object-side surface and a concave image-side surface on which at least one inflection point is formed; wherein there are four lens elements with refractive power; wherein the imaging lens assembly further comprises an aperture stop disposed between the first and second lens elements and an electronic sensor on which an object is imaged; and wherein the on-axis spacing between the aperture stop and the electronic sensor is SL, the on-axis spacing between the object-side surface of the first lens element and the electronic sensor is TTL, and they satisfy the relation: $0.75<SL/TTL<0.90$.

When the above relation is satisfied, a wide field of view can be favorably achieved, and a balance between the reduction of the lens assembly's size and the mitigation of the system's sensitivity can be attained.

In the aforementioned imaging lens assembly, it is preferable that the first lens element has a concave image-side surface so as to favorably correct the astigmatism of the system and to prevent the high order aberrations from becoming too large.

In the aforementioned imaging lens assembly, it is preferable that the object-side and image-side surfaces of the third and fourth lens elements are aspheric. Aspheric surfaces can be easily made into non-spherical profiles, allowing more design parameter freedom which can be used to reduce aberrations and the number of the lens elements, so that the total track length of the imaging lens assembly can be effectively reduced and the image quality can be improved as well. Additionally, the third and fourth lens elements are made of plastic material. Plastic material is not only favorable for the manufacture of the aspheric lens elements but also effectively reduces the production cost.

In the aforementioned imaging lens assembly, the focal length of the imaging lens assembly is f, the focal length of the first lens element is f1, and they preferably satisfy the relation: $1.20<f/f1<1.90$. When the above relation is satisfied, the refractive power of the first lens element is more balanced so that the total track length of the system can be effectively controlled to keep the imaging lens assembly compact. The above relation also prevents the high order spherical aberration from becoming too large, so that the image quality can be improved. And it will be more preferable that f and f1 satisfy the relation: $1.40<f/f1<1.65$.

In the aforementioned imaging lens assembly, the Abbe number of the first lens element is V1, the Abbe number of the second lens element is V2, and they preferably satisfy the relation: $30.0<V1-V2<38.0$. The above relation facilitates the correction of the chromatic aberration of the imaging lens assembly.

In the aforementioned imaging lens assembly, the focal length of the imaging lens assembly is f, the focal length of the third lens element is f3, and they preferably satisfy the relation: $1.00<f/f3<2.00$. When the above relation is satisfied, the refractive power that the system requires can be effectively distributed by the third lens element. Accordingly, the system's sensitivity can be reduced, thereby favorably reducing the manufacturing variability of the imaging lens assembly.

In the aforementioned imaging lens assembly, the focal length of the third lens element is f3, the focal length of the fourth lens element is f4, and they preferably satisfy the relation: $-1.50<f3/f4<-0.50$. When the above relation is satisfied, the telephoto structure with positive and negative refractive power formed by the third and fourth lens elements can be favorably secured, thereby effectively reducing the total track length of the system.

In the aforementioned imaging lens assembly, the on-axis spacing between the second and third lens elements is T23, the focal length of the imaging lens assembly is f, and they preferably satisfy the relation: 7.0<(T23/f)*100<20.0. The above relation facilitates the correction of the high order aberrations of the imaging lens assembly.

In the aforementioned imaging lens assembly, the radius of curvature of the object-side surface of the second lens element is R3, the focal length of the imaging lens assembly is f, and they preferably satisfy the relation: −18.0<R3/f<−0.7. When the above relation is satisfied, the back focal length of the imaging lens assembly can be effectively extended, thereby providing sufficient space to accommodate other components while preventing the total track length of the system from becoming too long.

In the aforementioned imaging lens assembly, the farthest point of the effective area of the image-side surface that allows incoming light to pass through the third lens element is the position of the clear aperture radius; a tangential plane is tangent to the image-side surface of the third lens element at the position of the clear aperture radius; a plane intersects the image-side surface of the third lens element at the position of the clear aperture radius and is perpendicular to the optical axis; the angle between the tangential plane and the plane is a tangential angle, ANG32, at the position of the clear aperture radius of the image-side surface of the third lens element. When the intersection of the plane and the optical axis is closer to the object side than the intersection of the tangential plane and the optical axis, ANG32 is negative. When the intersection of the plane and the optical axis is farther away from the object side than the intersection of the tangential plane and the optical axis, ANG32 is positive. It is preferable that ANG32 satisfies the relation: ANG32<−40 deg. The above relation effectively reduces the angle at which the light is projected onto the sensor and enhances the system's capability to correct the off-axis aberrations more favorably.

The aforementioned imaging lens assembly further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: TTL/ImgH<2.15. The above relation enables the imaging lens assembly to maintain a compact form so that it can be equipped in compact portable electronic products.

The present invention provides yet another imaging lens assembly comprising, in order from the object side to the image side: a first lens element with positive refractive power having a convex object-side surface; a second lens element with negative refractive power having a concave object-side surface; a third lens element with positive refractive power, the object-side and image-side surfaces thereof being aspheric; and a fourth lens element with negative refractive power having a convex object-side surface and a concave image-side surface on which at least one inflection point is formed, the object-side and image-side surfaces thereof being aspheric; wherein there are four lens elements with refractive power; wherein the imaging lens assembly further comprises an aperture stop disposed between the first and second lens elements and an electronic sensor on which an object is imaged; and wherein the on-axis spacing between the aperture stop and the electronic sensor is SL, the on-axis spacing between the object-side surface of the first lens element and the electronic sensor is TTL, the on-axis spacing between the second and third lens elements is T23, the focal length of the imaging lens assembly is f, the Abbe number of the first lens element is V1, the Abbe number of the second lens element is V2, and they satisfy the relations: 0.75<SL/TTL<0.90, 7.0<(T23/f)*100<20.0, 30.0<V1−V2<38.0.

When the relation of 0.75<SL/TTL<0.90 is satisfied, a wide field of view can be favorably achieved, and a balance between the reduction of the lens assembly's size and the mitigation of the system's sensitivity can be attained. When the relation of 7.0<(T23/f)*100<20.0 is satisfied, the high order aberrations of the imaging lens assembly can be favorably corrected. When the relation of 30.0<V1−V2<38.0 is satisfied, the chromatic aberration of the imaging lens assembly can be favorably corrected.

In the aforementioned imaging lens assembly, it is preferable that the third lens element has a concave object-side surface and a convex image-side surface so as to facilitate the correction of the astigmatism of the system. Preferably, the third and fourth lens elements are made of plastic material. Plastic material is not only favorable for the manufacture of the aspheric lens elements but also effectively reduces the production cost.

In the aforementioned imaging lens assembly, the radius of curvature of the object-side surface of the first lens element is R1, the radius of curvature of the image-side surface of the first lens element is R2, and they preferably satisfy the relation: −1.0<R1/R2<0.3. When the above relation is satisfied, the spherical aberration of the system can be favorably corrected.

In the aforementioned imaging lens assembly, the radius of curvature of the object-side surface of the second lens element is R3, the focal length of the imaging lens assembly is f, and they preferably satisfy the relation: −18.0<R3/f<−0.7. When the above relation is satisfied, the back focal length of the imaging lens assembly can be effectively extended, thereby providing sufficient space to accommodate other components while preventing the total track length of the system from becoming too long.

In the present imaging lens assembly, the lens elements can be made of glass or plastic material. If the lens elements are made of glass, there is more freedom in distributing the refractive power of the system. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the imaging lens assembly can be effectively reduced and the image quality can be improved as well.

In the present imaging lens assembly, if a lens element has a convex surface, it means the portion of the surface proximate to the axis is convex; if a lens element has a concave surface, it means the portion of the surface proximate to the axis is concave.

Preferred embodiments of the present invention will be described in the following paragraphs by referring to the accompanying drawings.

Figure 2:
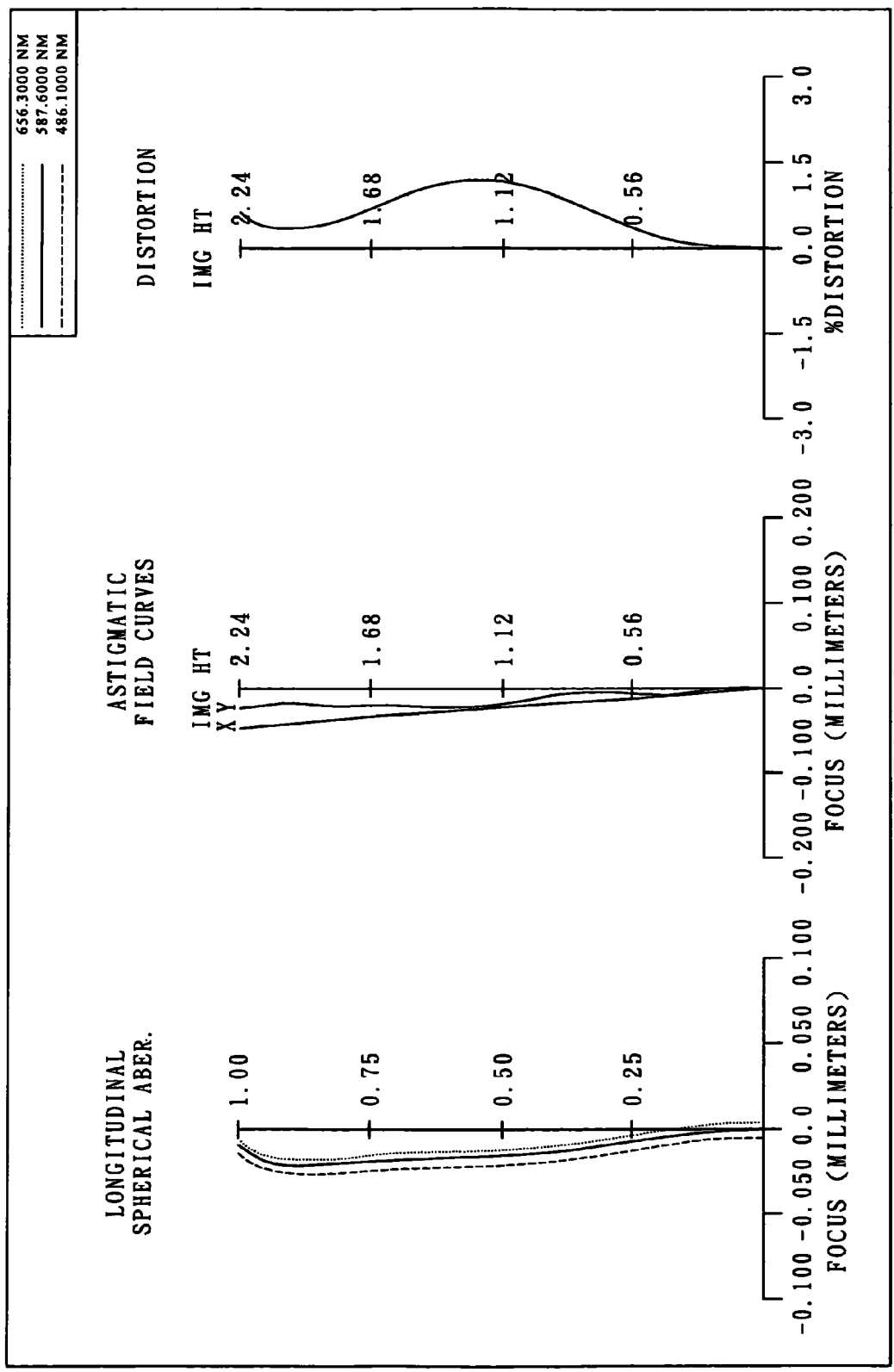
FIG. 2 shows the aberration curves of the first embodiment of the present invention.

FIG. 1 shows an imaging lens assembly in accordance with a first embodiment of the present invention, and FIG. 2 shows the aberration curves of the first embodiment of the present invention. The imaging lens assembly of the first embodiment of the present invention mainly comprises four lens elements, in order from the object side to the image side: a plastic first lens element 100 with positive refractive power having a convex object-side surface 101 and a convex image-side surface 102, the object-side and image-side surfaces 101 and 102 thereof being aspheric; a plastic second lens element 110 with negative refractive power having a concave object-side surface 111 and a concave image-side surface 112, the object-side and image-side surfaces 111 and 112 thereof being aspheric; a plastic third lens element 120 with positive refractive power having a concave object-side surface 121 and a convex image-side surface 122, the object-side and image-side surfaces 121 and 122 thereof being aspheric; and a plastic fourth lens element 130 with negative refractive power having a convex object-side surface 131 and a concave image-side surface 132 on which at least one inflection point is formed, the object-side and image-side surfaces 131 and 132 thereof being aspheric; wherein an aperture stop 140 is disposed between the first and second lens elements 100 and 110; wherein an IR filter 150 is disposed between the image-side surface 132 of the fourth lens element 130 and an image plane 160; and wherein the IR filter 150 is made of glass and has no influence on the focal length of the imaging lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present imaging lens assembly, the focal length of the imaging lens assembly is f, and it satisfies the relation: f=3.68 (mm).

In the first embodiment of the present imaging lens assembly, the f-number of the imaging lens assembly is Fno, and it satisfies the relation: Fno=2.80.

In the first embodiment of the present imaging lens assembly, half of the maximal field of view of the imaging lens assembly is HFOV, and it satisfies the relation: HFOV=31.2 deg.

In the first embodiment of the present imaging lens assembly, the on-axis spacing between the aperture stop 140 and the electronic sensor is SL, the on-axis spacing between the object-side surface 101 of the first lens element 100 and the electronic sensor is TTL, and they satisfy the relation: SL/TTL=0.82.

In the first embodiment of the present imaging lens assembly, the focal length of the imaging lens assembly is f, the focal length of the first lens element 100 is f1, and they satisfy the relation: f/f1=1.50.

In the first embodiment of the present imaging lens assembly, the Abbe number of the first lens element 100 is V1, the Abbe number of the second lens element 110 is V2, and they satisfy the relation: V1−V2=32.5.

In the first embodiment of the present imaging lens assembly, the focal length of the first lens element 100 is f1, the focal length of the third lens element 120 is f3, and they satisfy the relation: f1/f3=1.00.

In the first embodiment of the present imaging lens assembly, the focal length of the third lens element 120 is f3, the focal length of the fourth lens element 130 is f4, and they satisfy the relation: f3/f4=−0.76.

In the first embodiment of the present imaging lens assembly, the on-axis spacing between the second lens element 110 and the third lens element 120 is T23, the focal length of the imaging lens assembly is f, and they satisfy the relation: (T23/f)*100=13.9.

In the first embodiment of the present imaging lens assembly, the radius of curvature of the object-side surface 101 of the first lens element 100 is R1, the radius of curvature of the image-side surface 102 of the first lens element 100 is R2, and they satisfy the relation: R1/R2=−0.34.

In the first embodiment of the present imaging lens assembly, the radius of curvature of the object-side surface 111 of the second lens element 110 is R3, the focal length of the imaging lens assembly is f, and they satisfy the relation: R3/f=−3.24.

In the first embodiment of the present imaging lens assembly, the focal length of the imaging lens assembly is f, the focal length of the third lens element 120 is f3, and they satisfy the relation: f/f3=1.50.

In the first embodiment of the present imaging lens assembly, the tangential angle of the image-side surface 122 of the third lens element 120 at the position of the clear aperture radius is ANG32, and it satisfies the relation: ANG32=−66.0 deg.

In the first embodiment of the present imaging lens assembly, an electronic sensor is disposed at the image plane 160 for an object to be imaged thereon. The on-axis spacing between the object-side surface 101 of the first lens element 100 and the electronic sensor is TTL, half of the diagonal length of the effective pixel area of the electronic sensor is ImgH, and they satisfy the relation: TTL/ImgH=2.07.

The detailed optical data of the first embodiment is shown in FIG. 7 (TABLE 1), and the aspheric surface data is shown in FIGS. 8A and 8B (TABLES 2A and 2B), wherein the units of the radius of curvature, the thickness and the focal length are expressed in mm, and HFOV is half of the maximal field of view.

Figure 3:
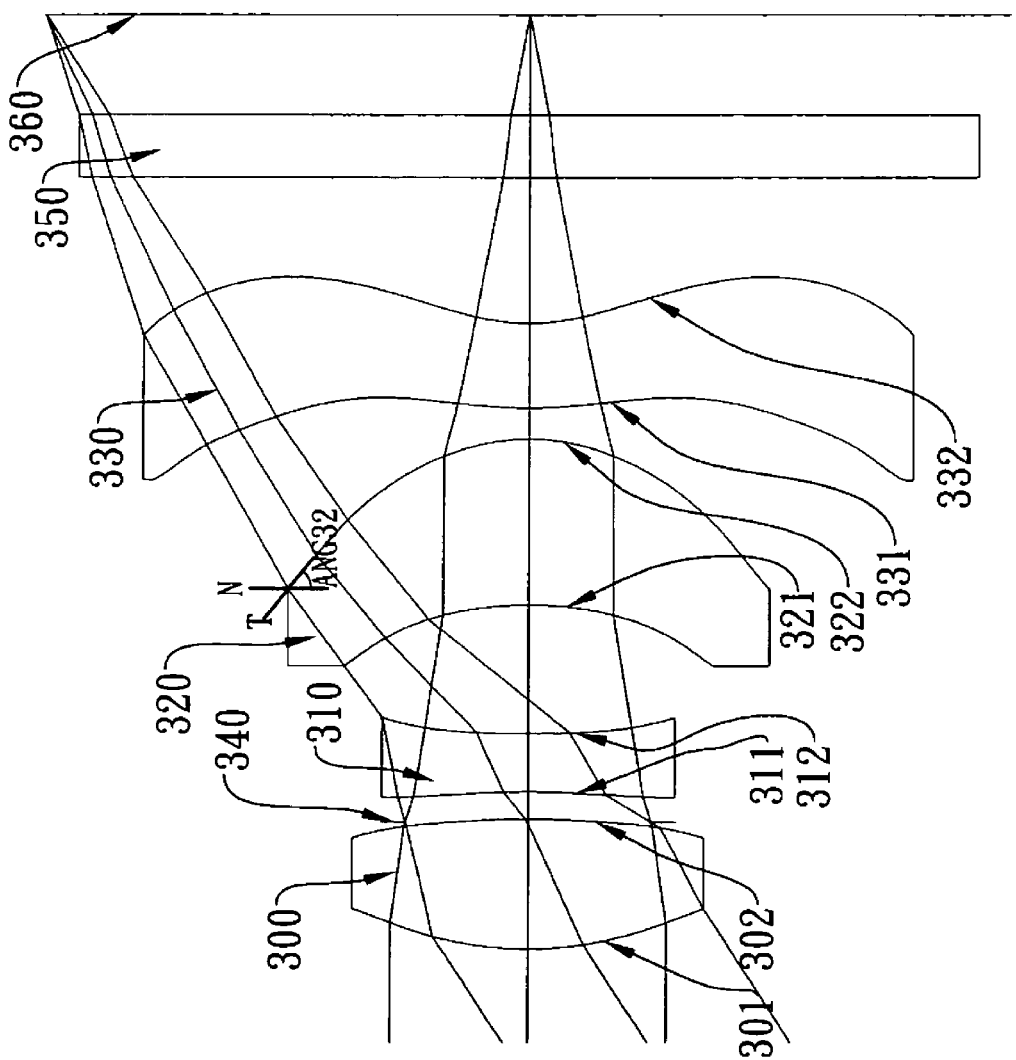
FIG. 3 shows an imaging lens assembly in accordance with a second embodiment of the present invention.
Figure 4:
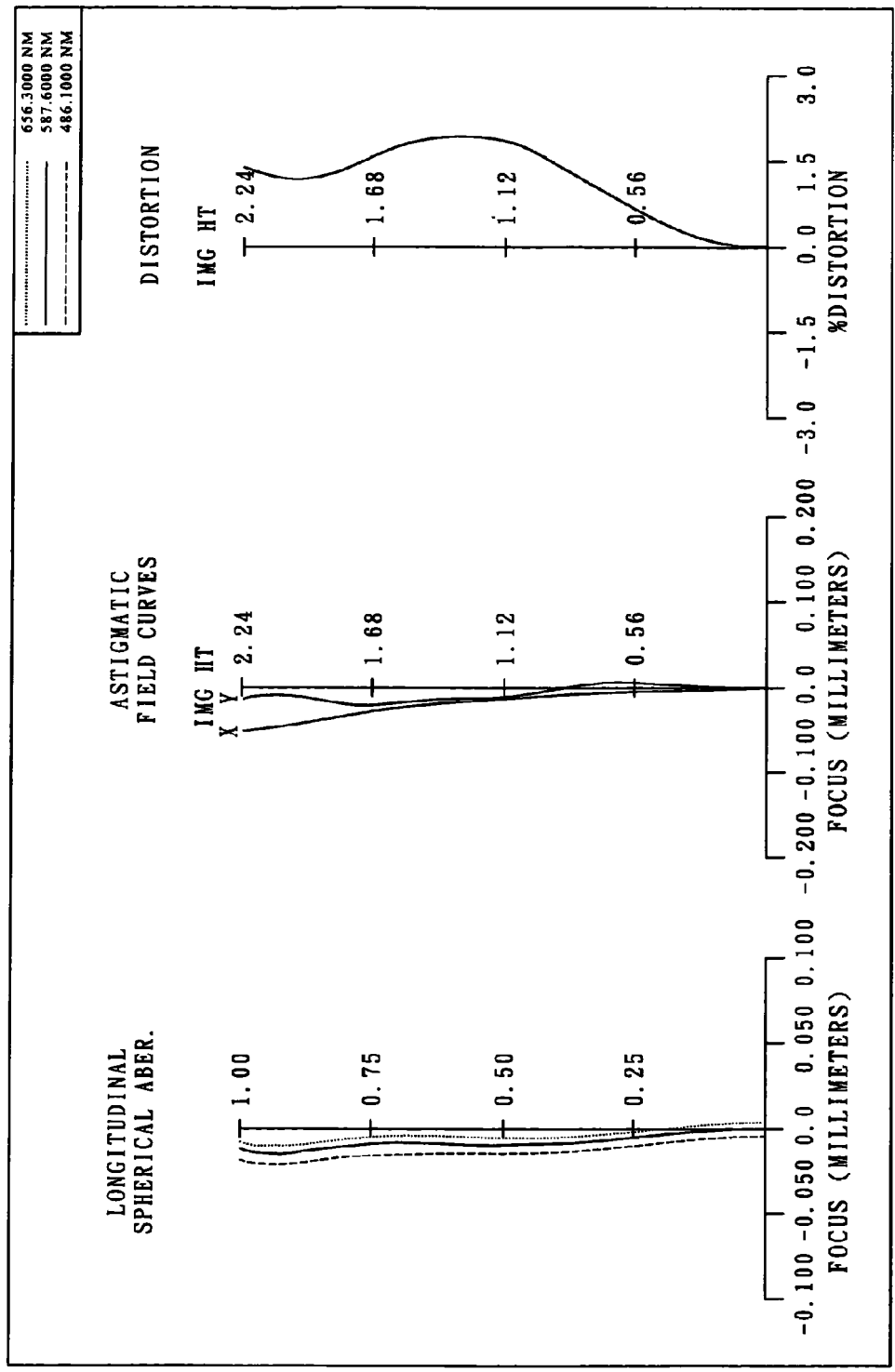
FIG. 4 shows the aberration curves of the second embodiment of the present invention.

FIG. 3 shows an imaging lens assembly in accordance with a second embodiment of the present invention, and FIG. 4 shows the aberration curves of the second embodiment of the present invention. The imaging lens assembly of the second embodiment of the present invention mainly comprises four lens elements, in order from the object side to the image side: a plastic first lens element 300 with positive refractive power having a convex object-side surface 301 and a convex image-side surface 302, the object-side and image-side surfaces 301 and 302 thereof being aspheric; a plastic second lens element 310 with negative refractive power having a concave object-side surface 311 and a concave image-side surface 312, the object-side and image-side surfaces 311 and 312 thereof being aspheric; a plastic third lens element 320 with positive refractive power having a concave object-side surface 321 and a convex image-side surface 322, the object-side and image-side surfaces 321 and 322 thereof being aspheric; and a plastic fourth lens element 330 with negative refractive power having a convex object-side surface 331 and a concave image-side surface 332 on which at least one inflection point is formed, the object-side and image-side surfaces 331 and 332 thereof being aspheric; wherein an aperture stop 340 is disposed between the first and second lens elements 300 and 310; wherein an IR filter 350 is disposed between the image-side surface 332 of the fourth lens element 330 and an image plane 360; and wherein the IR filter 350 is made of glass and has no influence on the focal length of the imaging lens assembly.

The equation of the aspheric surface profiles of the second embodiment has the same form as that of the first embodiment.

In the second embodiment of the present imaging lens assembly, the focal length of the imaging lens assembly is f, and it satisfies the relation: f=3.53 (mm).

In the second embodiment of the present imaging lens assembly, the f-number of the imaging lens assembly is Fno, and it satisfies the relation: Fno=2.80.

In the second embodiment of the present imaging lens assembly, half of the maximal field of view of the imaging lens assembly is HFOV, and it satisfies the relation: HFOV=32.0 deg.

In the second embodiment of the present imaging lens assembly, the on-axis spacing between the aperture stop 340 and the electronic sensor is SL, the on-axis spacing between the object-side surface 301 of the first lens element 300 and the electronic sensor is TTL, and they satisfy the relation: SL/TTL=0.82.

In the second embodiment of the present imaging lens assembly, the focal length of the imaging lens assembly is f, the focal length of the first lens element 300 is f1, and they satisfy the relation: f/f1=1.60.

In the second embodiment of the present imaging lens assembly, the Abbe number of the first lens element 300 is V1, the Abbe number of the second lens element 310 is V2, and they satisfy the relation: V1−V2=32.5.

In the second embodiment of the present imaging lens assembly, the focal length of the first lens element 300 is f1, the focal length of the third lens element 320 is f3, and they satisfy the relation: f1/f3=0.79.

In the second embodiment of the present imaging lens assembly, the focal length of the third lens element 320 is f3, the focal length of the fourth lens element 330 is f4, and they satisfy the relation: f3/f4=−0.83.

In the second embodiment of the present imaging lens assembly, the on-axis spacing between the second lens element 310 and the third lens element 320 is T23, the focal length of the imaging lens assembly is f, and they satisfy the relation: (T23/f)*100=17.5.

In the second embodiment of the present imaging lens assembly, the radius of curvature of the object-side surface 301 of the first lens element 300 is R1, the radius of curvature of the image-side surface 302 of the first lens element 300 is R2, and they satisfy the relation: R1/R2=−0.37.

In the second embodiment of the present imaging lens assembly, the radius of curvature of the object-side surface 311 of the second lens element 310 is R3, the focal length of the imaging lens assembly is f, and they satisfy the relation: R3/f=−0.95.

In the second embodiment of the present imaging lens assembly, the focal length of the imaging lens assembly is f, the focal length of the third lens element 320 is f3, and they satisfy the relation: f/f3=1.26.

In the second embodiment of the present imaging lens assembly, the tangential angle of the image-side surface 322 of the third lens element 320 at the position of the clear aperture radius is ANG32, and it satisfies the relation: ANG32=−46.5 deg.

In the second embodiment of the present imaging lens assembly, an electronic sensor is disposed at the image plane 360 for an object to be imaged thereon. The on-axis spacing between the object-side surface 301 of the first lens element 300 and the electronic sensor is TTL, half of the diagonal length of the effective pixel area of the electronic sensor is ImgH, and they satisfy the relation: TTL/ImgH=1.96.

The detailed optical data of the second embodiment is shown in FIG. 9 (TABLE 3), and the aspheric surface data is shown in FIGS. 10A and 10B (TABLES 4A and 4B), wherein the units of the radius of curvature, the thickness and the focal length are expressed in mm, and HFOV is half of the maximal field of view.

Figure 5:
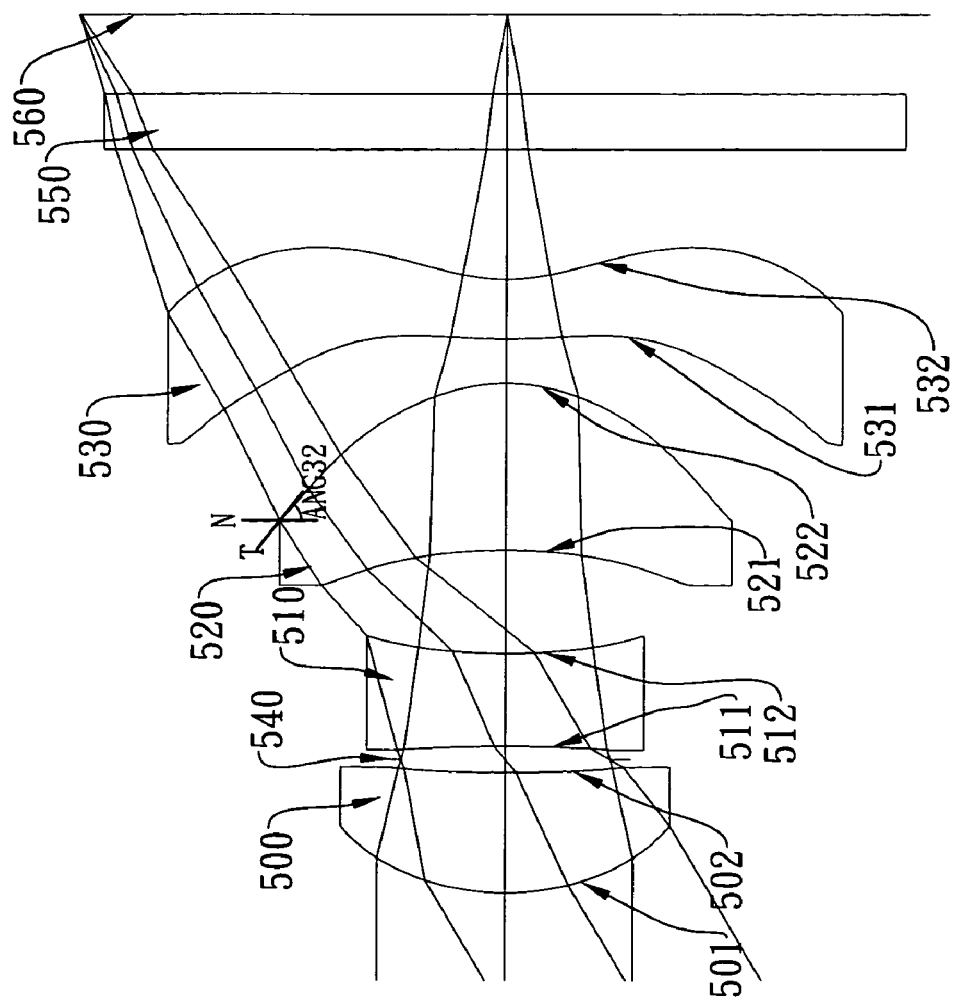
FIG. 5 shows an imaging lens assembly in accordance with a third embodiment of the present invention.
Figure 6:
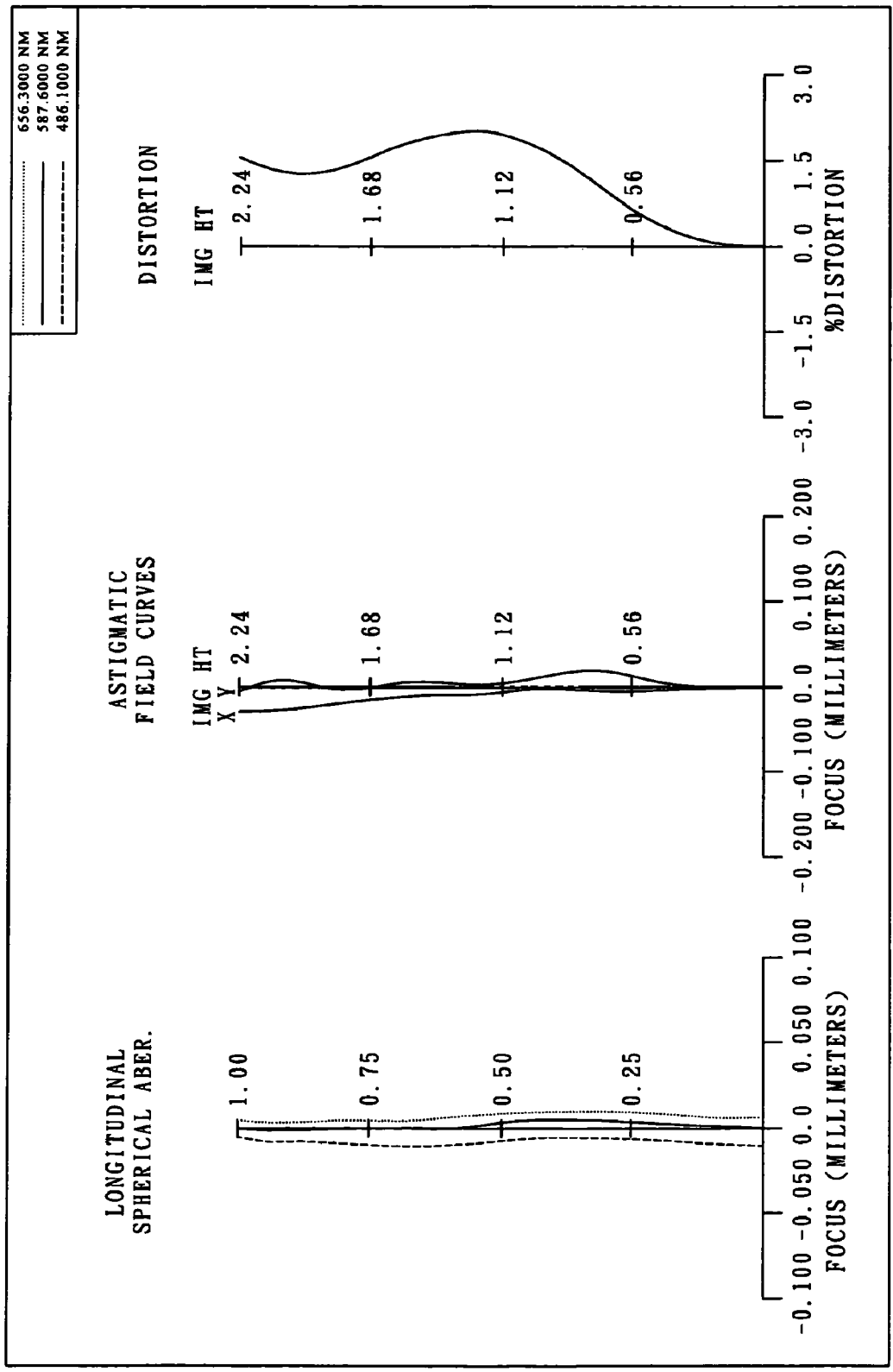
FIG. 6 shows the aberration curves of the third embodiment of the present invention.

FIG. 5 shows an imaging lens assembly in accordance with a third embodiment of the present invention, and FIG. 6 shows the aberration curves of the third embodiment of the present invention. The imaging lens assembly of the third embodiment of the present invention mainly comprises four lens elements, in order from the object side to the image side: a plastic first lens element 500 with positive refractive power having a convex object-side surface 501 and a concave image-side surface 502, the object-side and image-side surfaces 501 and 502 thereof being aspheric; a plastic second lens element 510 with negative refractive power having a concave object-side surface 511 and a concave image-side surface 512, the object-side and image-side surfaces 511 and 512 thereof being aspheric; a plastic third lens element 520 with positive refractive power having a concave object-side surface 521 and a convex image-side surface 522, the object-side and image-side surfaces 521 and 522 thereof being aspheric; and a plastic fourth lens element 530 with negative refractive power having a convex object-side surface 531 and a concave image-side surface 532 on which at least one inflection point is formed, the object-side and image-side surfaces 531 and 532 thereof being aspheric; wherein an aperture stop 540 is disposed between the first and second lens elements 500 and 510; wherein an IR filter 550 is disposed between the image-side surface 532 of the fourth lens element 530 and an image plane 560; and wherein the IR filter 550 is made of glass and has no influence on the focal length of the imaging lens assembly.

The equation of the aspheric surface profiles of the third embodiment has the same form as that of the first embodiment.

In the third embodiment of the present imaging lens assembly, the focal length of the imaging lens assembly is f, and it satisfies the relation: f=3.82 (mm).

In the third embodiment of the present imaging lens assembly, the f-number of the imaging lens assembly is Fno, and it satisfies the relation: Fno=2.85.

In the third embodiment of the present imaging lens assembly, half of the maximal field of view of the imaging lens assembly is HFOV, and it satisfies the relation: HFOV=30.1 deg.

In the third embodiment of the present imaging lens assembly, the on-axis spacing between the aperture stop 540 and the electronic sensor is SL, the on-axis spacing between the object-side surface 501 of the first lens element 500 and the electronic sensor is TTL, and they satisfy the relation: SL/TTL=0.80.

In the third embodiment of the present imaging lens assembly, the focal length of the imaging lens assembly is f, the focal length of the first lens element 500 is f1, and they satisfy the relation: f/f1=1.39.

In the third embodiment of the present imaging lens assembly, the Abbe number of the first lens element 500 is V1, the Abbe number of the second lens element 510 is V2, and they satisfy the relation: V1−V2=32.5.

In the third embodiment of the present imaging lens assembly, the focal length of the first lens element 500 is f1, the focal length of the third lens element 520 is f3, and they satisfy the relation: f1/f3=1.22.

In the third embodiment of the present imaging lens assembly, the focal length of the third lens element 520 is f3, the focal length of the fourth lens element 530 is f4, and they satisfy the relation: f3/f4=−0.85.

In the third embodiment of the present imaging lens assembly, the on-axis spacing between the second lens element 510 and the third lens element 520 is T23, the focal length of the imaging lens assembly is f, and they satisfy the relation: (T23/f)*100=14.6.

In the third embodiment of the present imaging lens assembly, the radius of curvature of the object-side surface 501 of the first lens element 500 is R1, the radius of curvature of the image-side surface 502 of the first lens element 500 is R2, and they satisfy the relation: R1/R2=0.11.

In the third embodiment of the present imaging lens assembly, the radius of curvature of the object-side surface 511 of the second lens element 510 is R3, the focal length of the imaging lens assembly is f, and they satisfy the relation: R3/f=−2.23.

In the third embodiment of the present imaging lens assembly, the focal length of the imaging lens assembly is f, the focal length of the third lens element 520 is f3, and they satisfy the relation: f/f3=1.70.

In the third embodiment of the present imaging lens assembly, the tangential angle of the image-side surface 522 of the third lens element 520 at the position of the clear aperture radius is ANG32, and it satisfies the relation: ANG32=−43.5 deg.

In the third embodiment of the present imaging lens assembly, an electronic sensor is disposed at the image plane 560 for an object to be imaged thereon. The on-axis spacing between the object-side surface 501 of the first lens element 500 and the electronic sensor is TTL, half of the diagonal length of the effective pixel area of the electronic sensor is ImgH, and they satisfy the relation: TTL/ImgH=2.07.

The detailed optical data of the third embodiment is shown in FIG. 11 (TABLE 5), and the aspheric surface data is shown in FIGS. 12A and 12B (TABLES 6A and 6B), wherein the units of the radius of curvature, the thickness and the focal length are expressed in mm, and HFOV is half of the maximal field of view.

It is to be noted that TABLES 1-6 (illustrated in FIGS. 7-12 respectively) show different data of the different embodiments, however, the data of the different embodiments are obtained from experiments. Therefore, any imaging lens assembly of the same structure is considered to be within the scope of the present invention even if it uses different data. The embodiments depicted above and the appended drawings are exemplary and are not intended to limit the claim scope of the present invention. TABLE 7 (illustrated in FIG. 13) shows the data of the respective embodiments resulting from the equations.

What is claimed is:

1. An imaging lens assembly comprising, in order from an object side to an image side:
   a first lens element with positive refractive power having a convex object-side surface and a convex image-side surface;
   a second lens element with negative refractive power having a concave object-side surface;
   a third lens element with positive refractive power having a convex image-side surface, at least one of the object-side and image-side surfaces thereof being aspheric; and
   a fourth lens element with negative refractive power having a convex object-side surface and a concave image-side surface on which at least one inflection point is formed;
   wherein there are four lens elements with refractive power; wherein the imaging lens assembly further comprises an aperture stop disposed between the first and second lens elements and an electronic sensor on which an object is imaged; and wherein an on-axis spacing between the aperture stop and the electronic sensor is SL, an on-axis spacing between the object-side surface of the first lens element and the electronic sensor is TTL, and they satisfy the relation: 0.75<SL/TTL<0.90.

2. The imaging lens assembly according to claim 1, wherein the on-axis spacing between the object-side surface of the first lens element and the electronic sensor is TTL, half of the diagonal length of the effective pixel area of the electronic sensor is ImgH, and they satisfy the relation: TTL/ImgH<2.15.

3. The imaging lens assembly according to claim 1, wherein the third lens element has a concave object-side surface, and the object-side and image-side surfaces of the third and fourth lens elements are aspheric.

4. The imaging lens assembly according to claim 3, wherein an on-axis spacing between the second and third lens elements is T23, the focal length of the imaging lens assembly is f, and they satisfy the relation: 7.0<(T23/f)*100<20.0.

5. The imaging lens assembly according to claim 3, wherein a radius of curvature of the object-side surface of the first lens element is R1, a radius of curvature of the image-side surface of the first lens element is R2, and they satisfy the relation: −0.8<R1/R2<0.0.

6. The imaging lens assembly according to claim 3, wherein a radius of curvature of the object-side surface of the second lens element is R3, the focal length of the imaging lens assembly is f, and they satisfy the relation: −18.0<R3/f<−0.7.

7. The imaging lens assembly according to claim 3, wherein a focal length of the imaging lens assembly is f, a focal length of the first lens element is f1, and they satisfy the relation: 1.20<f/f1<1.90.

8. The imaging lens assembly according to claim 7, wherein the focal length of the imaging lens assembly is f, the focal length of the first lens element is f1, and they satisfy the relation: 1.40<f/f1<1.65.

9. The imaging lens assembly according to claim 3, wherein an Abbe number of the first lens element is V1, an Abbe number of the second lens element V2, and they satisfy the relation: 28.0<V1−V2<46.0.

10. The imaging lens assembly according to claim 9, wherein the Abbe number of the first lens element is V1, the Abbe number of the second lens element is V2, and they satisfy the relation: 30.0<V1−V2<38.0.

11. The imaging lens assembly according to claim 3, wherein the second lens element has a concave image-side surface.

12. The imaging lens assembly according to claim 11, wherein the focal length of the first lens element is f1, a focal length of the third lens element is f3, and they satisfy the relation: 0.70<f1/f3<1.50.

13. The imaging lens assembly according to claim 11, wherein the focal length of the third lens element is f3, a focal length of the fourth lens element is f4, and they satisfy the relation: −1.50<f3/f4<−0.50.

14. The imaging lens assembly according to claim 11, wherein a farthest point of the effective area of the image-side surface that allows incoming light to pass through the third lens element is a position of a clear aperture radius; wherein a tangential plane is tangent to the image-side surface of the third lens element at the position of the clear aperture radius; wherein a plane intersects the image-side surface of the third lens element at the position of the clear aperture radius and is perpendicular to an optical axis; wherein an angle between the tangential plane and the plane is a tangential angle, ANG32, of the image-side surface of the third lens element at the position of the clear aperture radius; wherein when the intersection of the plane and the optical axis is closer to the object side than the intersection of the tangential plane and the optical axis, ANG32 is negative, and when the intersection of the plane and the optical axis is farther away from the object side than the intersection of the tangential plane and the optical axis, ANG32 is positive; and wherein ANG32 satisfies the relation: ANG32<−40 deg.

15. An imaging lens assembly comprising, in order from an object side to an image side:
  a first lens element with positive refractive power having a convex object-side surface;
  a second lens element with negative refractive power having a concave object-side surface and a concave image-side surface;
  a third lens element with positive refractive power having a concave object-side surface and a convex image-side surface, at least one of the object-side and image-side surfaces thereof being aspheric; and
  a fourth lens element with negative refractive power having a convex object-side surface and a concave image-side surface on which at least one inflection point is formed;
  wherein there are four lens elements with refractive power; wherein the imaging lens assembly further comprises an aperture stop disposed between the first and second lens elements and an electronic sensor on which an object is imaged; and wherein an on-axis spacing between the aperture stop and the electronic sensor is SL, an on-axis spacing between the object-side surface of the first lens element and the electronic sensor is TTL, and they satisfy the relation: 0.75<SL/TTL<0.90.

16. The imaging lens assembly according to claim 15 further comprising an electronic sensor on which an object is imaged, wherein the on-axis spacing between the object-side surface of the first lens element and the electronic sensor is TTL, half of the diagonal length of the effective pixel area of the electronic sensor is ImgH, and they satisfy the relation: TTL/ImgH<2.15.

17. The imaging lens assembly according to claim 15, wherein the object-side and image-side surfaces of the third and fourth lens elements are aspheric, and the third and fourth lens elements are made of plastic material.

18. The imaging lens assembly according to claim 17, wherein an Abbe number of the first lens element is V1, an Abbe number of the second lens element is V2, and they satisfy the relation: 30.0<V1−V2<38.0.

19. The imaging lens assembly according to claim 17, wherein a radius of curvature of the object-side surface of the second lens element is R3, the focal length of the imaging lens assembly is f, and they satisfy the relation: −18.0<R3/f<−0.7.

20. The imaging lens assembly according to claim 17, wherein a farthest point of the effective area of the image-side surface that allows incoming light to pass through the third lens element is a position of a clear aperture radius; wherein a tangential plane is tangent to the image-side surface of the third lens element at the position of the clear aperture radius; wherein a plane intersects the image-side surface of the third lens element at the position of the clear aperture radius and is perpendicular to an optical axis; wherein an angle between the tangential plane and the plane is a tangential angle, ANG32, of the image-side surface of the third lens element at the position of the clear aperture radius; wherein when the intersection of the plane and the optical axis is closer to the object side than the intersection of the tangential plane and the optical axis, ANG32 is negative, and when the intersection of the plane and the optical axis is farther away from the object side than the intersection of the tangential plane and the optical axis, ANG32 is positive; and wherein ANG32 satisfies the relation: ANG32<−40 deg.

21. The imaging lens assembly according to claim 17, wherein a focal length of the imaging lens assembly is f, a focal length of the first lens element is f1, and they satisfy the relation: 1.20<f/f1<1.90.

22. The imaging lens assembly according to claim 21, wherein the focal length of the imaging lens assembly is f, the focal length of the first lens element is f1, and they satisfy the relation: 1.40<f/f1<1.65.

23. The imaging lens assembly according to claim 17, wherein the focal length of the imaging lens assembly is f, a focal length of the third lens element is f3, and they satisfy the relation: 1.00<f/f3<2.00.

24. The imaging lens assembly according to claim 23, wherein the focal length of the third lens element is f3, a focal length of the fourth lens element is f4, and they satisfy the relation: −1.50<f3/f4<−0.50.

25. The imaging lens assembly according to claim 17, wherein an on-axis spacing between the second and third lens elements is T23, the focal length of the imaging lens assembly is f, and they satisfy the relation: 7.0<(T23/f)*100<20.0.

26. The imaging lens assembly according to claim 25, wherein the first lens element has a concave image-side surface.

27. An imaging lens assembly comprising, in order from an object side to an image side:
  a first lens element with positive refractive power having a convex object-side surface;
  a second lens element with negative refractive power having a concave object-side surface;
  a third lens element with positive refractive power, the object-side and image-side surfaces thereof being aspheric; and
  a fourth lens element with negative refractive power having a convex object-side surface and a concave image-side surface on which at least one inflection point is formed, the object-side and image-side surfaces thereof being aspheric; wherein there are four lens elements with refractive power; wherein the imaging lens assembly further comprises an aperture stop disposed between the first and second lens elements and an electronic sensor on which an object is imaged; and wherein an on-axis spacing between the aperture stop and the electronic sensor is SL, an on-axis spacing between the object-side surface of the first lens element and the electronic sensor is TTL, an on-axis spacing between the second and third lens elements is T23, a focal length of the imaging lens assembly is f, an Abbe number of the first lens element is V1, an Abbe number of the second lens element is V2, and they satisfy the relations: 0.75<SL/TTL<0.90, 7.0<(T23/f)*100<20.0, 30.0<V1−V2<38.0.

28. The imaging lens assembly according to claim 27, wherein the third lens element has a concave object-side surface and a convex image-side surface, and the third and fourth lens elements are made of plastic material.

29. The imaging lens assembly according to claim 28, wherein a radius of curvature of the object-side surface of the first lens element is R1, a radius of curvature of the image-side surface of the first lens element is R2, and they satisfy the relation: −1.0<R1/R2<0.3.

30. The imaging lens assembly according to claim 28, wherein a radius of curvature of the object-side surface of the second lens element is R3, the focal length of the imaging lens assembly is f, and they satisfy the relation: −18.0<R3/f<−0.7.

* * * * *